(12) United States Patent
Kato (10) Patent No.: US 6,515,708 B1
(45) Date of Patent: Feb. 4, 2003

(54) CLOCK GENERATOR, AND IMAGE DISPLAYING APPARATUS AND METHOD

(75) Inventor: Yoshiki Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/439,592

(22) Filed: Nov. 12, 1999

(30) Foreign Application Priority Data

Nov. 13, 1998 (JP) ............................................. 10-323757

(51) Int. Cl.⁷ ............................................... H04N 9/475
(52) U.S. Cl. ........................ 348/524; 348/536; 348/537; 348/542; 348/555
(58) Field of Search ................................ 348/524, 536, 348/537, 530, 531, 554, 555, 556, 542, 544, 445, 450; 345/213; 331/1 R; 375/327; H04N 5/06, 9/475

(56) References Cited

U.S. PATENT DOCUMENTS

| | | | |
|---|---|---|---|
| 3,559,092 A | | 1/1971 | Roth ............................ 331/16 |
| 5,629,962 A | * | 5/1997 | Okumura et al. ............ 375/376 |
| 5,721,570 A | * | 2/1998 | Tsunoda et al. ............. 345/213 |
| 5,739,867 A | | 4/1998 | Eglit ............................ 348/581 |
| 5,793,434 A | | 8/1998 | Lee ............................. 348/445 |
| 5,977,836 A | * | 11/1999 | Swan et al. .................. 331/1 A |
| 6,067,123 A | * | 5/2000 | Lee .............................. 348/554 |
| 6,069,666 A | * | 5/2000 | Lyons ......................... 348/512 |
| 6,097,440 A | * | 8/2000 | Omori et al. ................ 348/542 |
| 6,100,935 A | * | 8/2000 | Inoue .......................... 348/526 |

* cited by examiner

*Primary Examiner*—John Miller
*Assistant Examiner*—Jean W. Désir
(74) *Attorney, Agent, or Firm*—Frommer Lawrence & Haug LLP; William S. Frommer; Dennis M. Smid (57) ABSTRACT

A clock generator is provided which comprises a reference signal generator; a voltage controller/generator to generate a dot clock signal; a frequency divider to divide the frequency of the dot clock signal supplied from the voltage controller/generator; a phase comparator to detect a phase difference between the reference signal supplied from the reference signal generator and a signal supplied from the frequency divider; a frequency division ratio setter to set the frequency division ratio in the frequency divider to less than a quotient resulted from division of a total number of horizontal pixels in each of the video signals by a greatest common divisor of the total of horizontal pixels in the video signal having one format and total number of horizontal pixels in the video signal having the other format; and a frequency division ratio selector to select a frequency division ratio set by the frequency division ratio setter correspondingly to a format of a video signal.

6 Claims, 7 Drawing Sheets

CLOCK GENERATOR, AND IMAGE DISPLAYING APPARATUS AND METHOD

BACKGROUND OF THE INVENTION

1. Field of the Invention

The present invention relates to a clock generator adapted to generate different dot clock signals correspondingly to formats, respectively, of more than one video signal, formatted differently from each other, an image displaying apparatus and method in which the clock generator is used.

2. Description of the Related Art

The video signal formats adopted for the purpose of image display include those used in the television systems, such as HDTV (high-definition television) system and NTSC (National Television Standards Committee) double-speed system, which can implement a high resolution of image display with more than 1000 horizontal scanning lines (525 to 625 scanning lines in the conventional TV systems).

Figure 1:
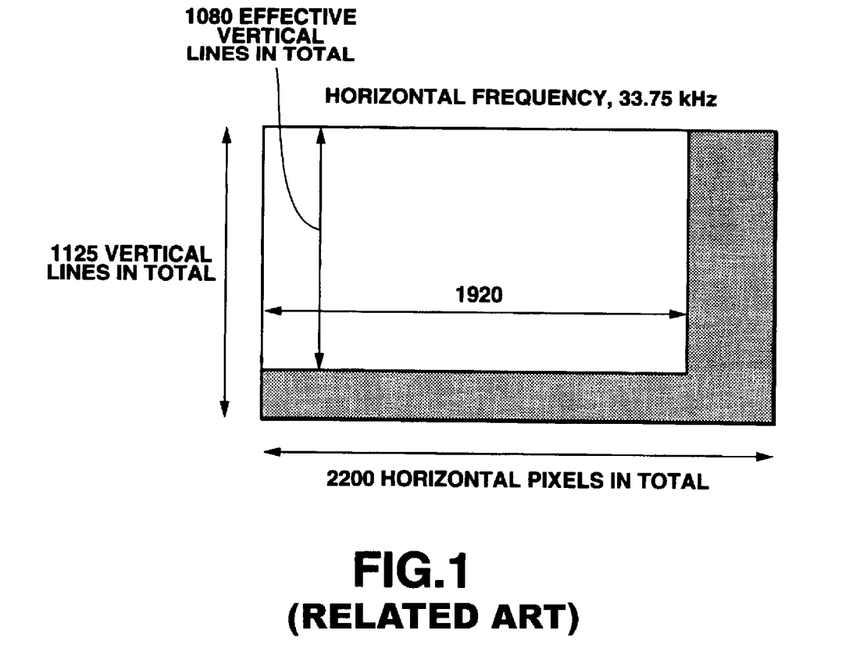
FIG. 1 explains an HDTV (high-definition television) signal.
Figure 2:
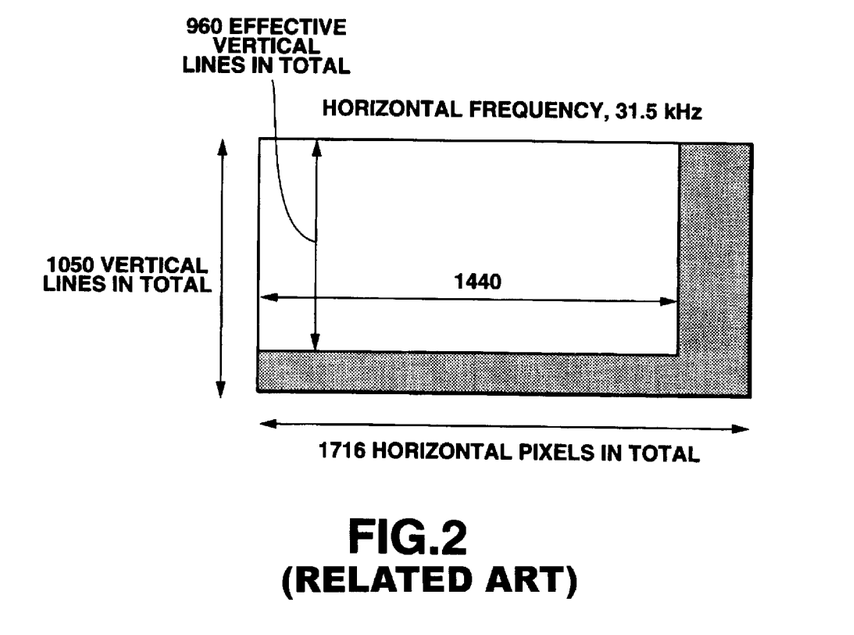
FIG. 2 explains an NTSC (National Television Standards Committee) double-speed signal.

The above HD signal and NTSC double-speed signal are video signals, respectively, formatted as shown in FIGS. 1 and 2, respectively. The HD signal has a total of 1125 vertical lines per frame as shown in FIG. 1, while the NTSC double-speed signal has a total of 1050 vertical lines per frame as shown in FIG. 2. The horizontal scanning frequency depends upon a total number of vertical lines per field and a vertical scanning frequency. So, when the vertical scanning frequency is 60 Hz, the horizontal scanning frequencies of the HD and NTSC double-speed signals are as follows:

| | |
|---|---|
| HD signal | 1125/2 × 60 = 33.75 kHz |
| NTSC double-speed signal | 1050/2 × 60 = 31.5 kHz |

Figure 3:
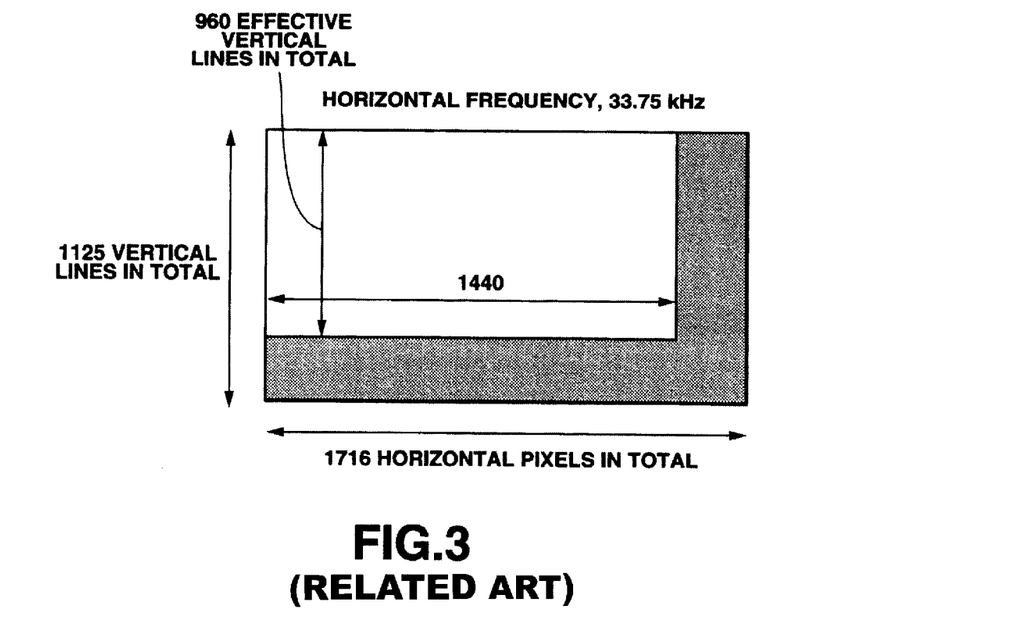
FIG. 3 explains a magnified NTSC double-speed vertical signal.

For displaying images of different horizontal scanning frequencies, a deflection system is necessary for each of the different horizontal scanning frequencies. To cope with this problem, the number of vertical lines in the NTSC double-speed signal is increased up to 1125 as shown in FIG. 3 for the NTSC double-speed signal to have a horizontal scanning frequency of 33.75 kHz. Namely, whichever a video signal supplied for display is, HD signal or NTSC double-speed signal, it will be displayed on the assumption that it has a horizontal scanning frequency of 33.75 kHz. Note that an NTSC double-speed signal whose number of vertical scanning lines is increased as mentioned above will be referred to as "magnified NTSC double-speed signal" hereinafter.

In the HD signal shown in FIG. 1, the ratio of 1920 effective horizontal pixels to the total of 2200 horizontal pixels (1920/2200) is approximately 0.87, while in the NTSC double-speed signal shown in FIG. 2, the ratio of 1440 effective horizontal pixels to the total of 1716 horizontal pixels is about 0.84. Since the ratio of the effective horizontal pixels to the total of horizontal pixels in the HD signal is larger than that of the effective horizontal pixels to the total of horizontal pixels in the NTSC double-speed signal, the effective horizontal pixels will occupy a larger part of the total of horizontal pixels in the HD signal than in the NTSC double-speed signal, which means that the retrace ratio for the HD signal is smaller than that for the NTSC double-speed signal.

The deflection system provided for the above-mentioned reason and adapted to operate correspondingly to the HD and NTSC double-speed signals, respectively, adds to the manufacturing costs of the TV set or image displaying apparatus because of the difference in retrace ratio between the HD and NTSC double-speed signals. To avoid such an additional cost, it has been proposed to increase the total number of horizontal pixels in the HD signal so that the retrace ratio for the HD signal is nearly the same as that for the NTSC double-speed signal.

Figure 4:
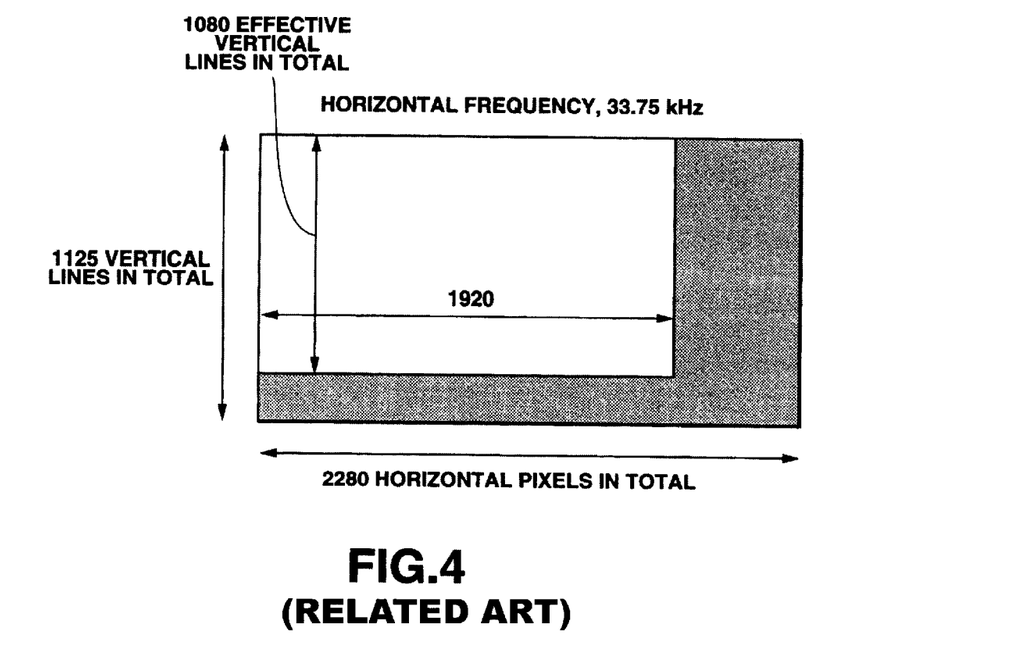
FIG. 4 explains a magnified HD horizontal retrace line signal.

The total of horizontal pixels in the HD signal, required for the above purpose, will count 2280 in number because 1920/total number of horizontal pixels is 0.84 as in the above. Thus, with the retrace ratio taken in consideration, a video signal is adopted which is formatted to include a total of 2280 horizontal pixels as shown in FIG. 4. The video signal formatted as shown in FIG. 4 will be referred to as "magnified-retrace HD horizontal signal" hereinafter.

Thus, a TV set in which 33.75 kHz is fixed as the horizontal deflection frequency, will display images represented by an HD signal as shown in FIG. 1, magnified NTSC double-speed vertical signal as shown in FIG. 3 and a magnified-retrace HD horizontal signal as shown in FIG. 4, respectively.

Frequencies of dot clock signals necessary for the three different formats of the HD signal, magnified NTSC double-speed vertical signal and magnified-retrace HD horizontal signal, respectively, are as will be described below. In Table 1 below, "dot clock" is a signal having a frequency derived from multiplication of the horizontal scanning frequency by the total number of horizontal pixels.

TABLE 1

| | Output format | Horizontal deflection frequency | Dot clock |
|---|---|---|---|
| HD signal | 1920 (2200) × 1080 (1125) | 33.75 kHz | 74.25 MHz |
| Magnified NTSC vertical signal | 1440 (1716) × 960 (1125) | 33.75 kHz | 57.915 MHz |
| Magnified-retrace HD horizontal signal | 1920 (2280) × 1080 (1125) | 33.75 kHz | 76.95 MHz |

Since the horizontal deflection frequency (33.75 kHz) of the magnified NTSC vertical signal is the same as that of the HD signal, a clock generator is used to generate a dot clock signal by multiplying a horizontal scanning frequency by a total number of horizontal pixels.

Figure 5A:
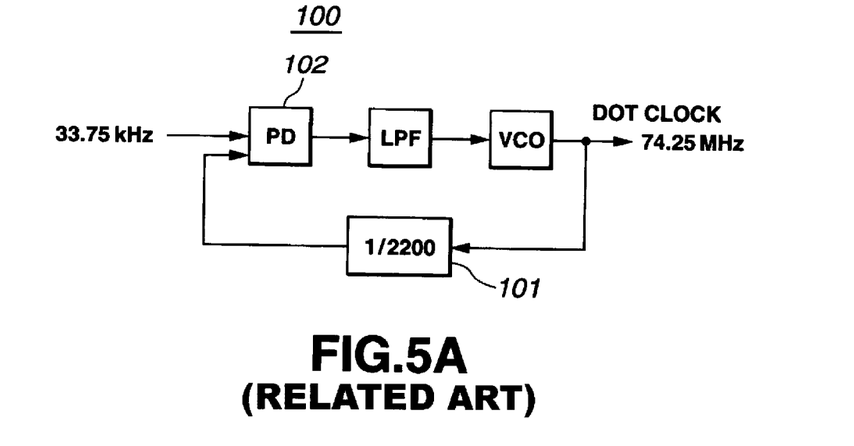
Figure 5B:
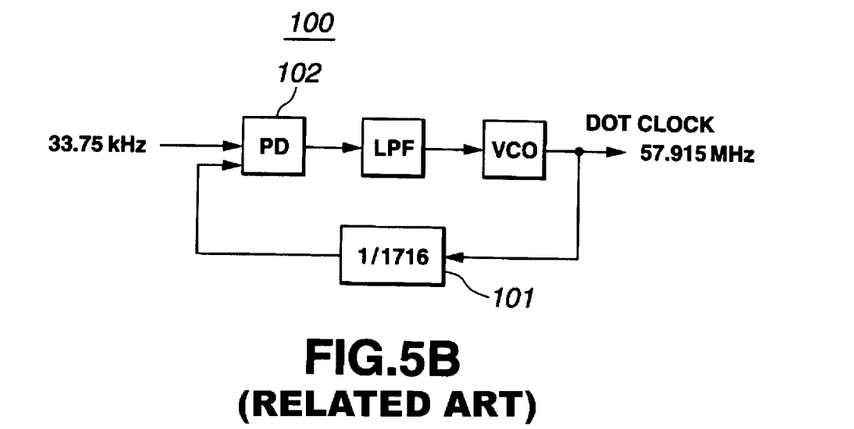
Figure 5C:
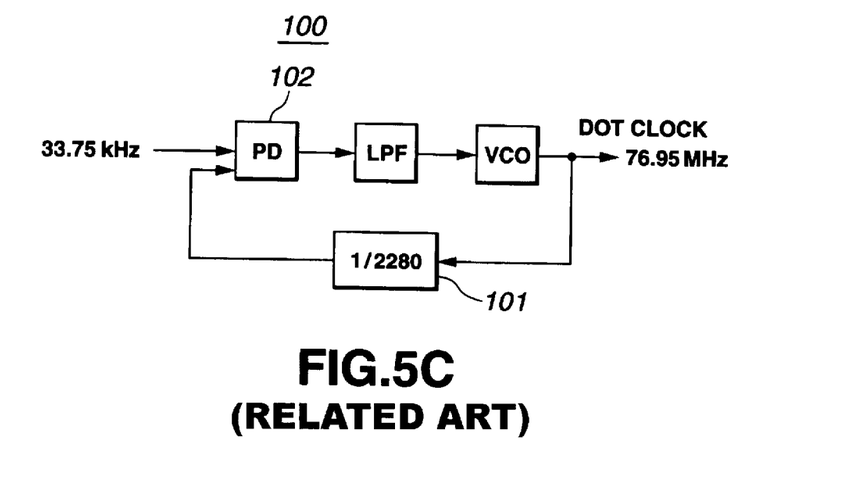

However, many of the conventional TV sets use the PLL circuit as shown in FIGS. 5A to 5C. In FIG. 5, the PLL circuit is generally indicated with a reference 100. To generate a dot clock signal for each of video signals formatted differently from each other, the PLL circuit designed as shown in FIG. 5 selects a frequency division ratio in a frequency divider 101 according to the video signal format. More particularly, in the PLL circuit 100, the frequency division ratio is changed to 2200 as shown in FIG. 5A to generate a dot clock signal for display of the HD signal as an image, to 1716 as shown in FIG. 5B to generate a dot clock signal for display of the magnified NTSC vertical signal, and to 2280 as shown in FIG. 5C to generate a dot clock signal for display of the magnified-retrace HD horizontal signal. For this changing of the frequency division ratio, a select signal is supplied from outside to the frequency divider 101.

Thus, for display of the HD signal, the PLL circuit 100 generates a dot clock signal of 74.25 MHz from the reference signal of 33.75 kHz. For display of the magnified NTSC vertical signal, the PLL circuit 100 generates a dot clock signal of 57.915 MHz from the reference signal. For display of the magnified-retrace HD horizontal signal, the PLL circuit 100 generates a dot clock signal of 76.95 MHz from the reference signal.

Since the frequency divider 101 in the PLL circuit 100 shown in FIG. 5 has a high frequency division ratio, however, a dot clock signal generated as in the above is likely to have many jitters. Also, in the PLL circuit 100, the reference signal supplied to a phase comparator 102 has a frequency as low as 33.75 kHz. Therefore, the PLL circuit 100 cannot generate a reference signal by a crystal oscillator. For generation of a stable reference signal of 33.75 kHz, a crystal oscillator is used to generate a signal of about 10 to 25 MHz, for example, in frequency and the signal is divided in frequency. Also the PLL circuit 100 is designed to generate a horizontal deflection frequency by further passing the dot clock signal through other frequency divider. The other frequency divider for generation of a signal having the horizontal deflection frequency has a frequency division ratio L which is determined based on a number of scanning lines in all horizontal directions.

Next, determination of a frequency division ratio N in the PLL circuit for each of three video signals having different formats such as the HD, magnified NTSC vertical signal and magnified-retrace horizontal signal, will be described below by way of example.

The total numbers of horizontal pixels in the formats of the magnified NTSC double-speed vertical signal, HD signal and magnified-retrace HD horizontal signal are 1717, 2200 and 2280, respectively. Each of these numbers is decomposed into prime factors as shown below:

$$1716 = 2*2*3*11*13 \tag{1}$$

$$2200 = 2*2*2*5*5*11 \tag{2}$$

$$2280 = 2*2*2*3*5*19 \tag{3}$$

In the PLL circuit, the frequency division ratio N will be any one of the above prime factor combinations (1) to (3).

Figure 6A:
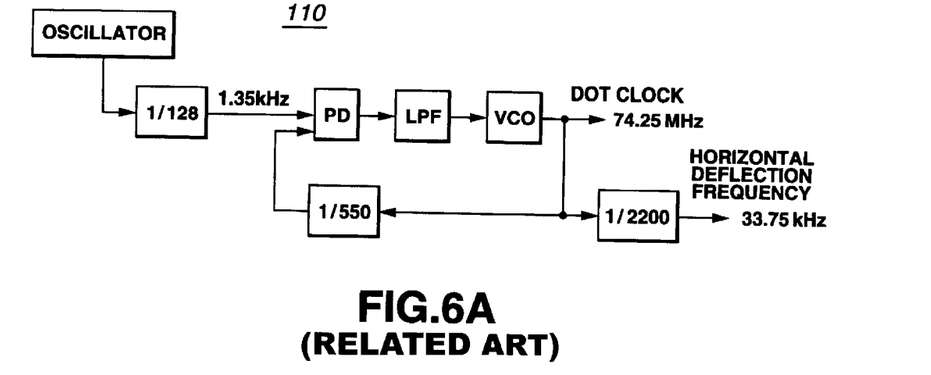
Figure 6B:
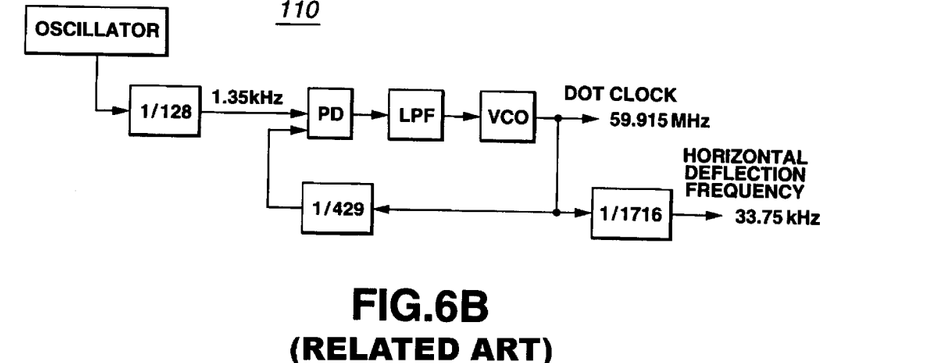
Figure 6C:
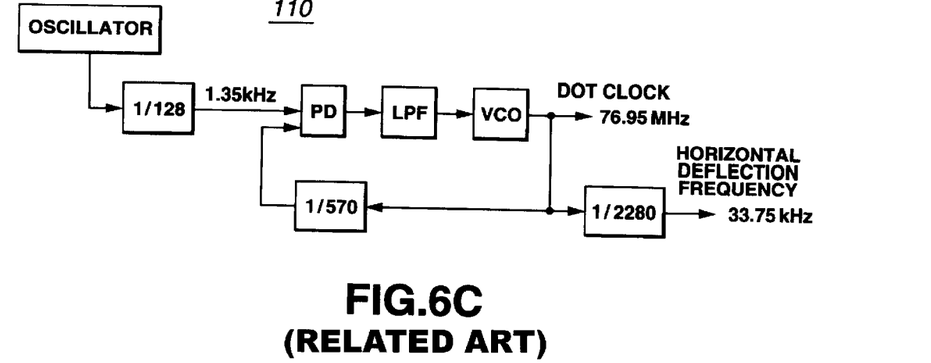

To use the same oscillator in a PLL circuit to generate dot clock signals for display of the magnified NTSC vertical signal, HD signal and magnified-retrace HD horizontal signal, each of the expressions (1) to (3) is divided by a greatest common divisor to provide a frequency division ratio N. Thus, the frequency division ratio N for the magnified NTSC vertical signal is 3*11*13=429, that for the HD signal is 2*5*5*11=550, and that for the magnified-retrace HD horizontal signal is 2*3*5*19=570. FIG. 6 shows PLL circuits capable of providing frequency division ratios N for the above signals, respectively. The PLL circuit is generally indicated with a reference 110. The PLL circuits 110 are configured for the frequency division ratios N for the above signals, as shown in FIGS. 6A to 6C, respectively. The PLL circuits 110 shown in FIG. 6 have frequency division ratios L of 2200, 1716 and 2280 determined depending upon the number of vertical scanning lines and dot clock signals for the signal formats, respectively, to provide a horizontal deflection frequency of 33.75 kHz.

In the PLL circuits 110 shown in FIG. 6, however, the frequency division ratio used to generate a signal for supply to the phase comparator is still high and the reference signal supplied to the phase comparator is as low as 135 kHz, so that a dot clock signal thus generated will have many jitters. Therefore, the PLL circuit 110 shown in FIG. 6 is not advantageous when processing an HD signal for display of a high-definition image.

FIG. 7 shows PLL circuits designed to provide frequency division ratios N of less than 100 and in which the reference frequency for supply to the phase comparator is in MHz. The PLL circuit is generally indicated with a reference 120.

Figure 7A:
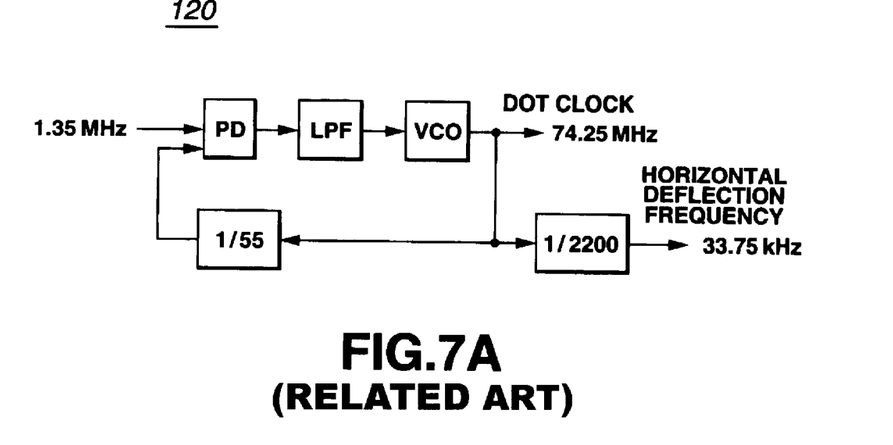
Figure 7B:
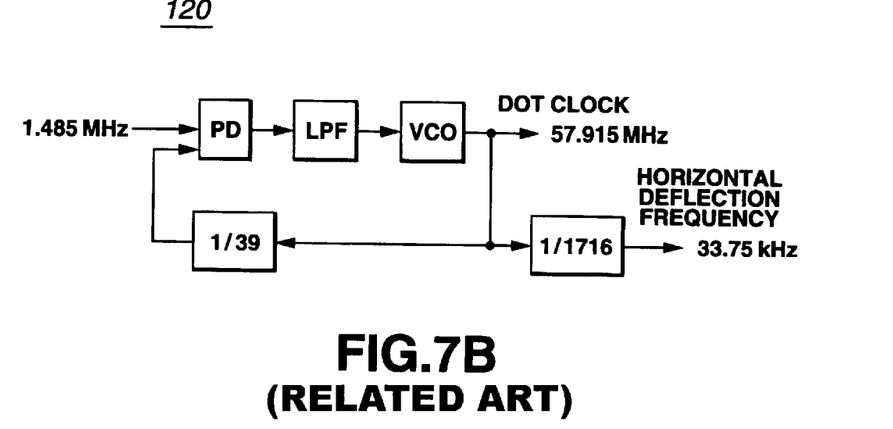
Figure 7C:
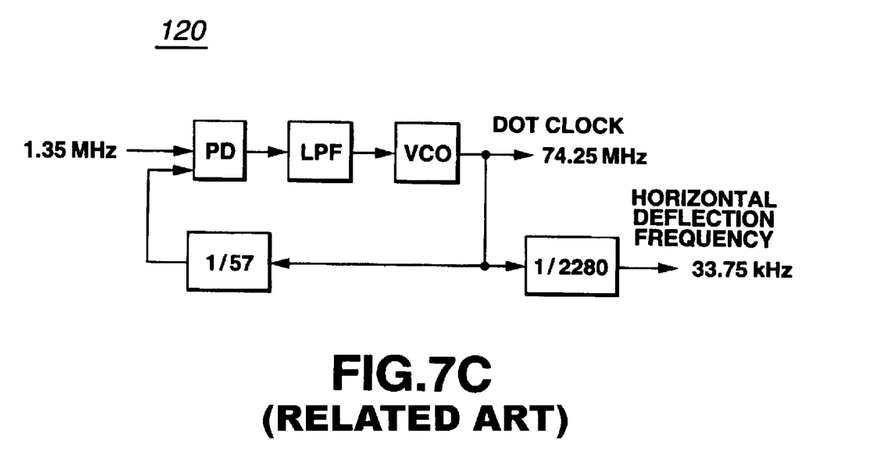

As shown in FIG. 7, the PLL circuit 120 provides a frequency division ratio N of 55 for the HD signal as in FIG. 7A, a frequency division ratio N of 39 for the magnified NTSC vertical signal as in FIG. 7B, and a frequency division ratio N of 57 for the magnified-retrace HD horizontal signal as shown in FIG. 7C, respectively. In the PLL circuit 120 shown in FIG. 7, the reference signal for generation of dot clock signals for the HD signal and magnified-retrace HD horizontal signal should have a frequency of 1.35 MHz, and that for generation of a dot clock signal for the magnified NTSC vertical signal should have a frequency of 1.485 MHz.

However, it is difficult to generate, by a common crystal oscillator, the frequency of 1.35 MHz for the reference signal from which the dot clock signal is generated for the HD signal and the frequency of 1.485 MHz for the reference signal from which the dot clock signal is generated for the magnified NTSC vertical signal. Two crystal oscillators are required for this purpose. Therefore, even if the frequency division ratio N is set low, the two crystal oscillators are necessary, which will add to the manufacturing costs for the image displaying apparatus.

OBJECT AND SUMMARY OF THE INVENTION

Accordingly, the present invention has an object to overcome the above-mentioned drawbacks of the prior art by providing a clock generator adapted to generate jitter-less dot clock signals for video signals different in format from each other, an image displaying apparatus and method, in which the clock generator is used.

The above object can be attained by providing a clock generator adapted to different dot clock signals correspondingly to formats, respectively, of video signals to be displayed as images, comprising according to the present invention:

means for generating a reference signal;

a voltage controlling/generating means for generating a dot clock signal;

means for dividing the frequency of the dot clock signal supplied from the voltage controlling/generating means;

a phase comparison means for detecting a phase difference between the reference signal supplied from the reference signal generating means and a signal supplied from the frequency dividing means;

a frequency division ratio setting means for setting the frequency division ratio for the frequency dividing means to less than a quotient resulted from division of a total number of horizontal pixels in each of the video signals by a greatest common divisor of the total number of horizontal pixels in the video signal having one format and total number of horizontal pixels in the video signal having the other format; and a frequency division ratio selecting means for selecting a frequency division ratio set by the frequency division ratio setting means correspondingly to a format of a video signal.

In the above clock generator, the frequency division ratio setting means for setting the frequency division ratio for the frequency dividing means to less than a quotient resulted from division of a total number of horizontal pixels in each of the video signals by a greatest common divisor of the total number of horizontal pixels in the video signal having one format and total number of horizontal pixels in the video signal having the other format, is used to generate a dot clock signal for a video signal by changing the number of horizontal pixels in an image represented by the video signal to set a necessary frequency division ratio for the video signal.

Also the above object can be attained by providing an image displaying apparatus to display an image using a video signal converted according to a dot clock signal generated at a frequency division ratio set to less than a quotient resulted from division of a total number of horizontal pixels in each of the video signals by a greatest common divisor of the total number of horizontal pixels in the video signal having one format and total number of horizontal pixels in the video signal having the other format.

Also the above object can be attained by providing an image displaying method in which an image is displayed using a video signal converted according to a dot clock signal generated at a frequency division ratio set to less than a quotient resulted from division of a total number of horizontal pixels in each of the video signals by a greatest common divisor of the total number of horizontal pixels in the video signal having one format and total number of horizontal pixels in the video signal having the other format.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIG. 5 explains conventional clock generators, FIG. 5A showing the clock generator for a dot clock signal for the HD signal, FIG. 5B showing the clock generator for a dot clock signal for the magnified NTSC double-speed vertical signal, and FIG. 5C showing the clock generator for a dot clock signal for the magnified HD double-speed vertical retrace line signal;

FIG. 6 explains other conventional clock generators, FIG. 6A showing the clock generator for a dot clock signal for the HD signal, FIG. 6B showing the clock generator for a dot clock signal for the magnified NTSC double-speed vertical signal, and FIG. 6C showing the clock generator for a dot clock signal for the magnified HD double-speed vertical retrace line signal;

FIG. 7 explains still other conventional clock generators, FIG. 7A showing the clock generator for a dot clock signal for the HD signal, FIG. 7B showing the clock generator for a dot clock signal for the magnified NTSC double-speed vertical signal, and FIG. 7C showing the clock generator for a dot clock signal for the magnified HD double-speed vertical retrace line signal;

FIG. 10 explains clock generators having provided therein a frequency division ratio controller to select a frequency division ratio, FIG. 10A showing the clock generator for a dot clock signal for the HD signal, FIG. 10B showing the clock generator for a dot clock signal for the magnified NTSC double-speed vertical signal, and FIG. 10C showing the clock generator for a dot clock signal for the magnified HD double-speed vertical retrace line signal.

DETAILED DESCRIPTION OF THE PREFERRED EMBODIMENTS

Figure 8:
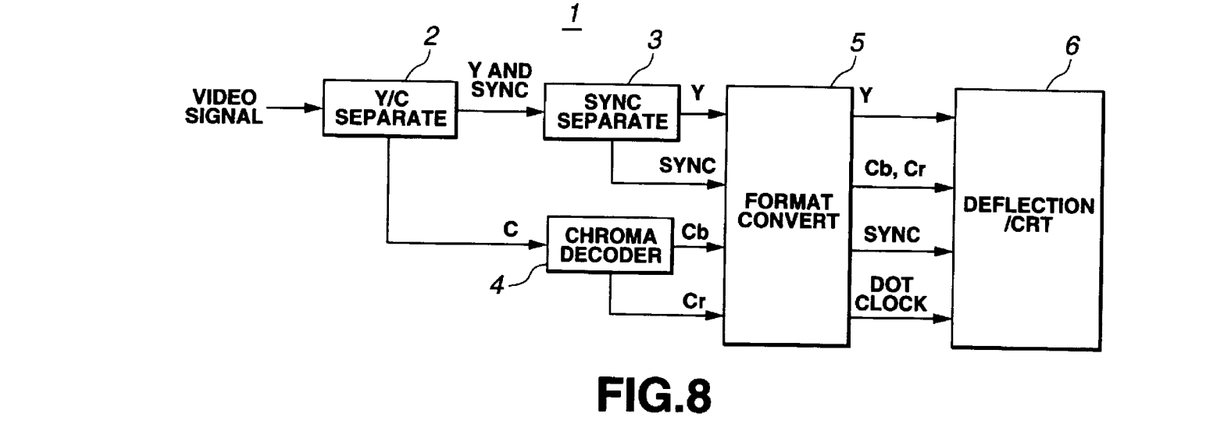
FIG. 8 is a schematic block diagram of an image display apparatus according to the present invention.

Referring now to FIG. 8, there is schematically illustrated in the form of a block diagram an image display apparatus according to the present invention. The image displaying apparatus is generally indicated with a reference 1. As shown, the image displaying apparatus 1 comprises a Y/C separator 2 to which a video signal including a luminance signal (Y), color signal (C) and a sync signal. The Y/C separator 2 separates the video signal into the luminance signal (Y) and color signal (C), and provides the luminance signal (Y) to a sync signal separator 3 while providing the color signal (C) to a chroma decoder 4.

The video signals for input to the Y/C separator 2 include a magnified NTSC vertical signal having a format as shown in FIG. 3, HD signal having a format as shown in FIG. 1, and a magnified-retrace HD horizontal signal having a format as shown in FIG. 4. As will be seen, these signals are different in format from each other. The image displaying apparatus 1 processes these input video signals according to their respective formats to display the images represented by the input video signals, respectively.

The sync signal separator 3 is supplied with the luminance signal (Y) and sync signal from the Y/C separator 2, and separates the luminance signal (Y) and sync signal from each other. The sync signal is formed into a horizontal sync signal and a vertical sync signal. The sync signal separator 3 provides to a format converter 5 the horizontal and vertical sync signals along with the luminance signal (Y).

The chroma decoder 4 generates chrominance signals (Cb) and (Cr) from the color signal (C) supplied from the Y/C separator 2, and provides the chrominance signals (Cb) and (Cr) to the format converter 5.

The format converter 5 is provided to convert video signals having different formats, supplied to the Y/C separator 2 from outside. Thus the format converter 5 provide the luminance signal (Y), chrominance signals (Cb) and (Cr), and horizontal and vertical sync signals to a deflection/CRT unit 6. The format converter 5 generates a dot clock signal for delivery to the deflection/CRT unit 6.

Figure 9:
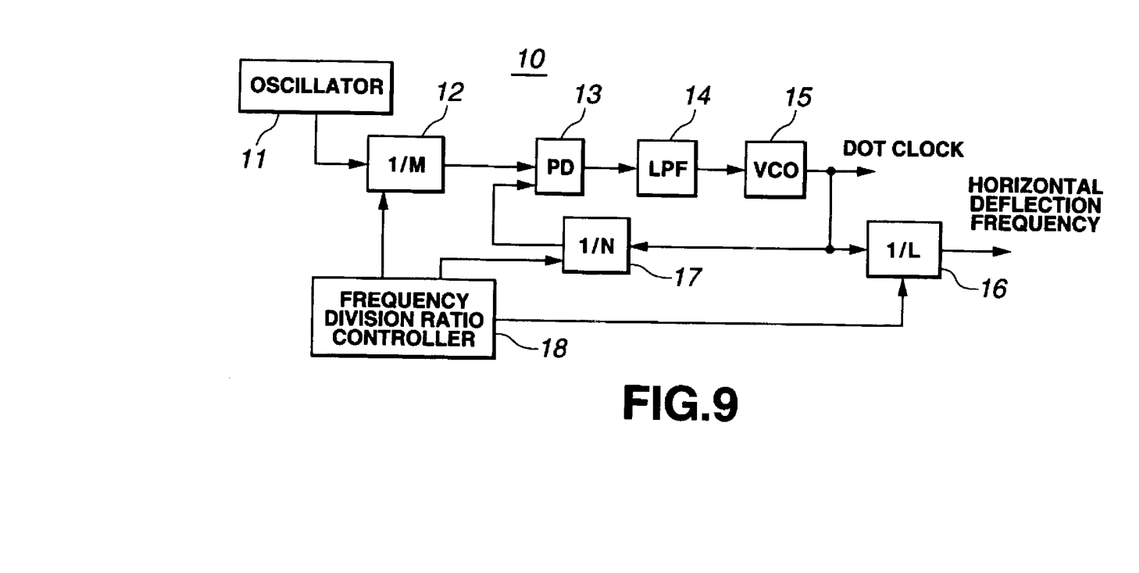
FIG. 9 is also a schematic block diagram of a clock generator provided in the image display apparatus according to the present invention.

Also the format converter 5 incorporates a clock generator generally indicated with a reference 10 as shown in FIG. 9. The clock generator 10 incorporated in the format converter 5 functions as will be described below:

The deflection/CRT unit 6 displays an image based on the luminance signal (Y), chrominance signals (Cb) and (Cr) supplied from the format converter 5. Specifically, the deflection/CRT unit 6 displays an image according to the format of its corresponding video signal using the horizontal and vertical sync signals and dot clock signal.

The clock generator 10 included in the format converter 5 as shown in FIG. 9 includes a crystal oscillator 11 which applies a voltage to a crystal to generate a reference signal having about 10 to 25 MHz. The crystal oscillator 11 provides the reference signal thus generated to a frequency divider 12.

The frequency divider 12 divides a reference signal supplied from the crystal oscillator 11 to provide a reference signal of 1.35 MHz, for example. More specifically, th frequency divider 12 will divide a reference signal supplied from the crystal oscillator 11, at a frequency division ratio M designated by a frequency division ratio controller 18, and provides the reference signal to a phase comparator 13.

The phase comparator 13 is supplied with the reference signal from the frequency divider 12 and also with a signal from another frequency divider 17. Detecting a phase difference between the reference signal and the signal supplied from the frequency divider 17, the phase comparator 13 provides an LPF (low pass filter) 14 with a signal corresponding to the detected phase difference.

The LPF 14 filters the signal corresponding to the phase difference, supplied from the phase comparator 13, and provides the filtered signal to a VCO (voltage control oscillator) 15.

The VCO 15 generates a dot clock signal based on the signal supplied from the LPF 14. More specifically, the VCO 15 generates a dot clock signal corresponding to the format of a video signal supplied to the Y/C separator 2 and provides it to the deflection/CRT unit 6. Also, the VCO 15 provides the generated dot clock signal to a still another frequency divider 16 and the frequency divider 17.

The frequency divider 16 divides the frequency of the dot clock signal supplied from the VCO 15 at a frequency division ratio L designated by the frequency division ratio controller 18, to generate a signal of a horizontal deflection frequency and provides it to the deflection/CRT unit 6.

The frequency divider 17 divides the frequency of the dot clock signal supplied from the VCO 15 at a frequency division ratio N designated by the frequency division ratio controller 18, to generate a signal of the same frequency, 1.35 MHz, for example, as that of the reference signal. The frequency divider 17 provides the signal to the phase comparator 13.

The frequency division ratio controller 18 generates, based on the format of a video signal supplied to the Y/C separator 2, a control signal which is used to change the frequency division ratio of each of the frequency dividers 12, 16 and 17. For changing the frequency division ratio N of the frequency divider 17 according to the format of the video signal, the frequency division ratio controller 18 will set the frequency division ratio N to less than a quotient resulted from division of the total number of horizontal pixels in each of the video signals by a greatest common divisor of the total number of horizontal pixels in the video signal in consideration and that in a video signal having the other format.

More particularly, when a magnified NTSC double-speed vertical signal is supplied to the Y/C separator 2, the frequency division ratio controller 18 will set the frequency division ratio N to 1720 by increasing the total number of 1716 horizontal pixels in the signal as shown in FIG. 1. As having previously been described, the total numbers of horizontal pixels in the formats of the HD signal, magnified NTSC double-speed vertical signal and magnified-retrace HD horizontal signal are 1717, 2200 and 2280, respectively. In the frequency division ratio controller 18, when each of these numbers will be decomposed into prime factors as shown below:

2200=2*2*2*5*5*11

1720=2*2*2*5*43

2280=2*2*2*3*5*19

Namely, the greatest common divisor of the total numbers of horizontal pixels in the formats of the above signals being 40 (2*2*2*5), the frequency division ratio controller 18 will set the frequency division ratio N, for each of the signals, to less than a quotient resulted from division of each of the total numbers of horizontal pixels by the greatest common divisor.

Figure 10A:
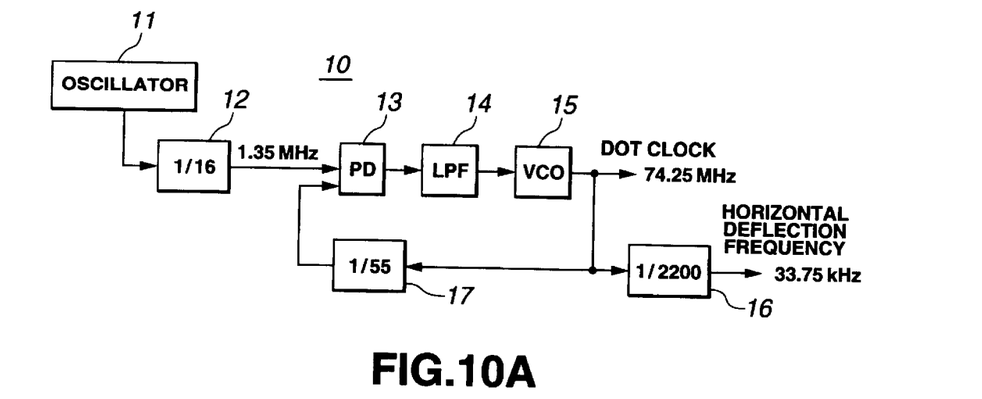
Figure 10B:
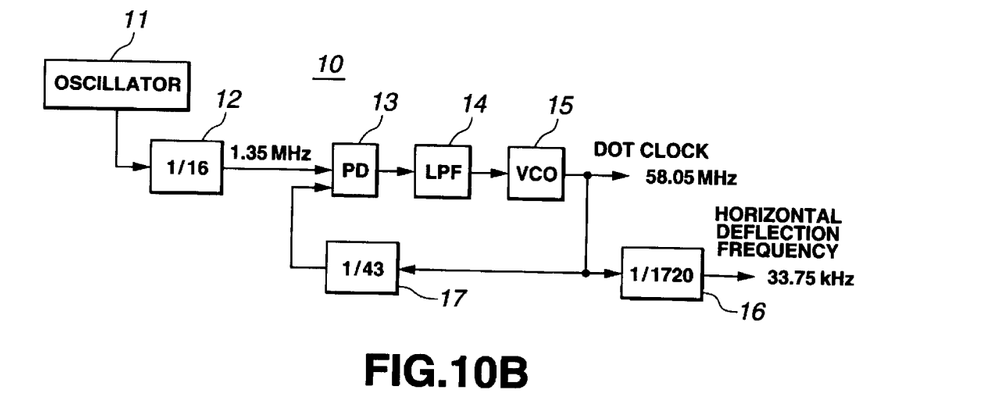
Figure 10C:
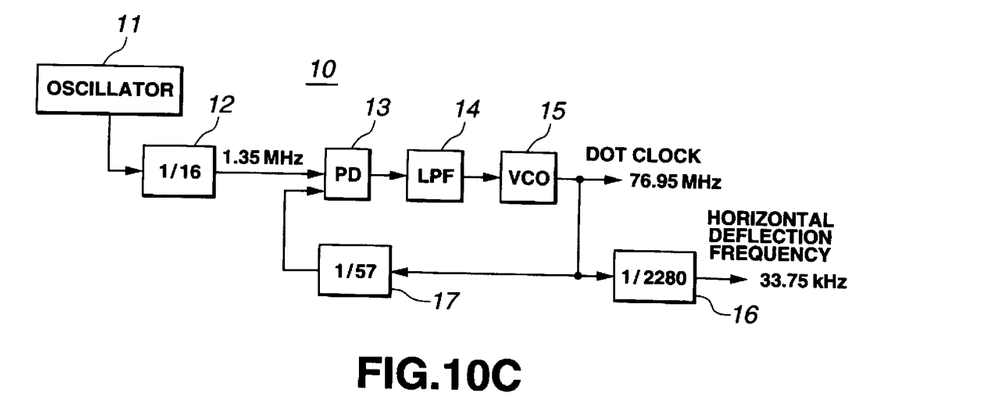

Thus, the frequency division ratio controller 18 sets a frequency division ratio N of 55 (5*11) for generation of a dot clock signal for the HD signal as shown in FIG. 10A, and generates a dot clock signal having a frequency of 74.25 MHz. Also, the frequency division ratio controller 18 sets a frequency division ratio N of 43 for generation of a dot clock signal for the magnified NTSC double-speed vertical signal as shown in FIG. 10B, and generates a dot clock signal having a frequency of 58.05 MHz. Further, the frequency division ratio controller 18 sets a frequency division ratio N of 57 (3*19) for generation of a dot clock signal for the magnified-retrace HD horizontal signal as shown in FIG. 10C. In this case, the dot clock signal will have a frequency of 76.95 MHz.

Then, when a video signal is supplied to the Y/C separator 2, the frequency division ratio controller 18 will judge the format of the video signal and generates a control signal for changing the frequency division ratio of the frequency divider 17, to thereby control the frequency division ratios of the frequency dividers 12, 16 and 17.

In the clock generator 10 in which the frequency division ratio N of the frequency divider 17 is controlled, the frequency division ratio M of the frequency divider 12 is set to 1/16, whereby the reference signal of 21.6 MHz from the crystal oscillator 11 is supplied as a reference signal having a frequency of 1.35 MHz to the phase comparator 13, as will be seen from FIG. 10. Also, in the clock generator 10, the frequency division ratio N of the frequency divider 17 is changed for the format of each video signal correspondingly to a control signal supplied from the frequency division ratio controller 18 as shown in FIGS. 10A to 10C, to thereby generate a dot clock signal.

Moreover, in the clock generator 10, as the frequency division ratio L of the frequency divider 16 is set by the frequency division ratio controller 18 by changing the number of vertical scanning lines, it is changed to 2200, 1720 or 2280 for the format of each video signal, thereby generating a signal having a horizontal deflection frequency of 33.75 kHz.

Thus, since the magnified NTSC double-speed vertical signal can be displayed with the dot clock signal of 58.05 MHz larger than the dot clock signal of 57.915 MHz in the prior art, the number of horizontal pixels displayed on the deflection/CRT unit 6 will be larger than the number of pixels displayed with the dot clock signal of 57.915 MHz.

Therefore, when the image displaying apparatus according to the present invention is supplied with video signals different in format from each other such as the magnified NTSC double-speed vertical signal, HD signal and magnified-retrace horizontal signal, the clock generator 10 according to the present invention sets a frequency division ratio N for each of the input video signals by adjusting the total number of horizontal pixels for display of an image represented by each of the video signals and calculating the greatest common divisor of the numbers of pixels in the signal formats. Thus the clock generator 10 permits to set a small frequency division ratio, so that a dot clock signal having less jitters can be generated.

In addition, the clock generator 10 permits to set a reference signal having a frequency as high as 1.35 MHz for input to the phase comparator 13.

Furthermore, the clock generator 10 can generate a dot clock signal using the common crystal oscillator 11 even when the image displaying apparatus according to the present invention is supplied with video signals having different formats.

When setting a frequency division ratio N by means of the frequency division ratio controller 18 in the clock generator 10, the total number of horizontal pixels in the magnified NTSC double-speed vertical signal is increased by four. Of course, however, the increase by four is not any problem in view of the deflection system precision.

Also when controlling the frequency divider 16 which generates a signal having the horizontal scanning frequency, the frequency division ratio controller 18 may select an appropriate frequency division ratio L by changing the number of vertical scanning lines as in changing the total number of horizontal pixels.

In the foregoing, the image displaying apparatus 1 has been described concerning an example in which a plurality of video signals different in format from each other, such as the HD signal, magnified NTSC double-speed vertical signal and magnified-retrace HD horizontal signal, is supplied to the Y/C separator 2 and dot clock signals are generated for display of the video signals. However, the dot clock signals can be generated by changing the total number of horizontal pixels for a smaller frequency division ratio N even when video signals of different formats are processed for display.

Further, as shown in FIG. 8, the image displaying apparatus is adapted such that a composite signal is supplied to the image display apparatus and subjected to the Y/C separation. However, the image displaying apparatus may be adapted so that a video signal compressed as in MPEG such as a digital TV broadcast signal is supplied to the apparatus and decoded as in MPEG before it is supplied to the format converter 5.

As having been described in the foregoing, the frequency division ratio controller provided in the clock generator according to the present invention controls the frequency division ratios of the frequency dividing means by changing the number of horizontal pixels of an image represented by an input video signal, calculating a dot clock signal and setting, based on the dot clock signal, a frequency division ratio at which a frequency division is made by the frequency dividers. Therefore, it is possible to generate a dot clock signal by setting a frequency division ratio through changing of the number of horizontal pixels of an image represented by the input video signal. The frequency division ratio for generation of a dot clock signal can be set low correspondingly to video signals having different formats, and thus it is possible to generate a dot clock signal having less jitters. Because of this clock generator, a common oscillator can be used for generation of dot clock signals for video signals having different formats, which contributes to a reduction of the manufacturing costs for the image displaying apparatus.

In the image displaying apparatus and method according to the present invention, the numbers of horizontal pixels in images represented by two or more video signals equal in horizontal scanning frequency to each other and different in number of horizontal pixels from each other, are changed to set frequency division ratios, the frequency division ratios are used to generate dot clock signals, the video signals are converted according to the dot clock signals, and the converted video signals are used to display the images. So, it is possible to set smaller frequency division ratios for generation of dot clock signals for video signals having different formats and generate the dot clock signals having less jitters.

What is claimed is:

1. A clock generator adapted to generate different dot clock signals correspondingly to formats, respectively, of video signals to be displayed as images, comprising:

means for generating a reference signal;

a voltage controlling/generating means for generating a dot clock signal;

means for dividing the frequency of the dot clock signal supplied from the voltage controlling/generating means;

a phase comparison means for detecting a phase difference between the reference signal supplied from the reference signal generating means and a signal supplied from the frequency dividing means;

a frequency division ratio setting means for setting a frequency division ratio for the frequency dividing means to less than a quotient resulted from division of a total number of horizontal pixels in each of the video signals by a greatest common divisor of the total number of horizontal pixels in the video signal having one format and total number of horizontal pixels in the video signal having the other format; and a frequency division ratio selecting means for selecting a frequency division ratio set by the frequency division ratio setting means correspondingly to a format of a video signal, whereby, in setting the frequency division ratio, the frequency division ratio setting means adjusts the total number of horizontal pixels of at least one respective video signal so as to form at least one adjusted total number, and calculates the greatest common divisor for the at least one adjusted total number and any other total number of horizontal pixels for said video signals.

2. An image displaying apparatus, comprising:

means for input of two or more video signals having different formats;

means for converting one of the video signals supplied to the input means according to a dot clock signal generated at a frequency division ratio set to less than a quotient resulted from division of a total number of horizontal pixels in a video signal to be displayed by a greatest common divisor of the total number of horizontal pixels in the video signal having one format and total number of horizontal pixels in other video signal having the other format; and means for displaying an image using the video signal from the converting means and according to the dot clock signal, whereby the frequency division ratio is obtained by adjusting the total number of horizontal pixels of at least one respective video signal so as to form at least one adjusted total number, and calculating the greatest common divisor for the at least one adjusted total number and any other total number of horizontal pixels for said video signals.

3. The apparatus as set forth in claim 2, wherein the converting means further includes a clock generator comprising:

means for generating a reference signal;

a voltage controlling/generating means for generating a dot clock signal;

means for dividing the frequency of the dot clock signal supplied from the voltage controlling/generating means;

a phase comparison means for detecting a phase difference between the reference signal supplied from the reference signal generating means and a signal supplied from the frequency dividing means;

a frequency division ratio setting means for setting the frequency division ratio for the frequency dividing means to less than a quotient resulted from division of a total number of horizontal pixels in each of the video signals by a greatest common divisor of the total number of horizontal pixels in the video signal having one format and total number of horizontal pixels in the video signal having the other format; and a frequency division ratio selecting means for selecting a frequency division ratio set by the frequency division ratio setting means correspondingly to a format of a video signal.

4. The apparatus as set forth in claim 2, further comprising:

means for controlling the horizontal scanning frequency by comparing numbers of vertical scanning lines in the two or more video signals supplied to the input means with each other, and adjusting the number of vertical scanning lines in more than one or two of the video signals.

5. An image displaying method, comprising the steps of:

converting one of two or more video signals according to a dot clock signal generated at a frequency division ratio set to less than a quotient resulted from division of a total number of horizontal pixels in each of the video signals by a greatest common divisor of the total number of horizontal pixels in the video signal having one format and total number of horizontal pixels in the video signal having the other format; and displaying an image using the converted video signal and according to the dot clock signal, whereby the frequency division ratio is obtained by adjusting the total number of horizontal pixels of at least one respective video signal so as to form at least one adjusted total number, and calculating the greatest common divisor for the at least one adjusted total number and any other total number of horizontal pixels for said video signals.

6. The method as set forth in claim 5, further comprising the step of:

control the horizontal scanning frequency by comparing numbers of vertical scanning lines in two or more video signals with each other, and adjusting the number of vertical scanning lines in more than one or two of the video signals.

* * * * *